United States Patent [19]

Jacob et al.

[11] Patent Number: 4,834,560
[45] Date of Patent: May 30, 1989

[54] PLURAL RING BEARING HAVING AT LEAST TWO RADIALLY SUPERIMPOSED BEARINGS

[75] Inventors: Werner Jacob, Frankfurt; Paul-Gerhard Hoch, Schweinfurt, both of Fed. Rep. of Germany

[73] Assignee: SKF GmbH, Schweinfurt, Fed. Rep. of Germany

[21] Appl. No.: 133,938

[22] Filed: Dec. 17, 1987

[30] Foreign Application Priority Data

Dec. 18, 1986 [DE] Fed. Rep. of Germany ....... 3643277

[51] Int. Cl.$^4$ .............................................. F16C 19/28
[52] U.S. Cl. .................................... 384/461; 384/564; 384/571; 384/901
[58] Field of Search ............... 384/461, 901, 571, 569, 384/564

[56] References Cited

U.S. PATENT DOCUMENTS

| 1,804,600 | 5/1931 | Edson | 384/461 |
| 2,195,795 | 4/1940 | Baker | 384/564 |
| 4,602,407 | 7/1986 | Gresens | 384/461 |

FOREIGN PATENT DOCUMENTS 1400319 2/1960 Fed. Rep. of Germany .
3324811 1/1985 Fed. Rep. of Germany .

Primary Examiner—Lenard A. Footland
Attorney, Agent, or Firm—Rosen, Dainow & Jacobs

[57] ABSTRACT

A plural ring bearing is comprised of at least outer and inner radially superimposed rolling bearings and has an intermediate ring common to the inner and outer bearings. The outer bearing comprises an inclined roller bearing with two rows of cylindrical rollers inclined with respect to one another and to the axis of the plural ring bearing. The inner bearing may have two rows of cylindrical or tapered rollers, and may additionally include a crossed roller bearing.

16 Claims, 5 Drawing Sheets

PLURAL RING BEARING HAVING AT LEAST TWO RADIALLY SUPERIMPOSED BEARINGS

This invention relates to a plural ring bearing comprised of at least two radially superimposed rolling bearings having a bearing ring common to the two bearings.

Bearings of this type are used especially in the printing press industry for the bearings of printing cylinders, whereby one or more intermediate rings are provided with off center races for the precise adjustment of the printing cylinder for the radially superimposed bearings. In order to avoid misprinting, especially in multicolor printing, a bearing of this type must be completely play free in the radial direction and sufficiently stiff in the axial direction.

In one known arrangement of such a bearing, two rows of tapered rollers are arranged between the bearing rings.(DE-OS No. 14 00 319). Of these pairs of rolling body rows, one pair has an X arrangement and the other has an O arrangement. (In an X arrangement the force action lines of the rollers of the two rows converge toward the bearing central axis while in an O arrangement the force action lines of the rollers of the two rows diverge toward the bearing central axis.) In this known arrangement both the outer ring as well as the inner ring are separated in a direction transverse to the bearing axis, to form two separate rings. The respective rings are held together by screws or the like, whereby the bearing play or prestress between the bearing ring adjusting spacing ring can be precisely adjusted. This arrangement is very expensive to produce and requires an involved adjustment in the installation of the bearing.

A bearing having three radially superimposed bearing rings is also known for the pins of rubber cylinders of printing machines, in which the radially superimposed bearing is comprised of cylindrical rollers or needle bearings, and one of the intermediate rings is axially supported at each axial end of the cylinderical or needle bearing provided ball rows (DE-OS No. 33 24 811). This known arrangement is relatively wide and consists of a large number of individual parts.

It is an object of the present invention to provide a rolling bearing of the above described type, that is compact and is easily manufactured, which not only is play free in the radial direction, i.e. prestressed, but also is adequately stiff in the axial direction and moreover can be assembled in a simple manner.

In accordance with the invention, for the solution of this object, the outer bearing is in the form of an inclined roller bearing with two rows of cylindrical rollers inclined with respect to one another and with respect to the axis of rotation of the bearing. In such a bearing, the cylindrical rollers of the two rows are arranged with their axes of rotation diverging toward the axis of rotation of the bearing and the outer ring is divided at right angles to its axis, so that by fitting together and/or twisting the outer ring parts, the bearing can be adjusted and prestressed to be play free not only radially, but also axially. At the same time the intermediate ring is radially compressed, i.e. minimized in diameter, so that the space of the inner bearing is reduced, i.e. the bearing is prestressed. In this manner a precise bearing for printing cylinders is attainable.

The cylindrical rollers of the two cylindrical roller rows can also be arranged with their axes of rotation converging toward the bearing axis, i.e. with diverging force action lines, to provide a very stiff construction.

In order to avoid the separation of the outer ring into two rings, in accordance with a further embodiment of the invention a split outer ring can be used, or a free guide edge can be arranged on the intermediate ring or on the outer ring, which is secured in the axial direction.

In the arrangement of the cylindrical rollers of the two cylindrical roller rows between fixed guide edges, the use of an undivided outer ring is possible, if a filling opening for the cylindrical rollers is arranged in a guide edge.

By the formation of the outer bearing as a so called cross roller bearing, in which the cylindrical rollers are in the same axial plane, but alternating with the axes of rotation inclined with respect to one another, the space requirements of the bearings are substantially reduced in the axial direction, while at the same time a greater stiffness is ensured.

If the two outer cylindrical roller rows are axially displaced with respect to the two inner rolling body rows, the races can be formed in a region of greater material thickness of the inner ring. With this arrangement, the intermediate ring can be thinner without changing the diameter of the bearing.

If the bearing is a fixed bearing, the inner bearing is advantageously formed as a two row tapered roller bearing, in which one guide edge of the inner ring is free (i.e. not permanently affixed to the bearing ring). This free guide edge is installed against the roller in the axial direction during assembly, whereby play freeness or pretension can also be produced in the inner bearing. This installation can for example be produced by a slotted nut, i.e. a nut with a slot adapted to receive a spanner wrench, or the like.

In order to avoid the direct cutting of threads in the bearing ring, it is advantageous in accordance with the invention to provide an annular groove in the inner ring, and to install a threaded ring with threads in its outer surface in the groove.

In order to enable the simple assembly of the inner bearing, it is advantageous to separate the inner ring in two parts in a direction at right angles to the axis of the bearing, the two rings being connected together by clamping means after loading the bearing with the tapered rollers in the intermediate ring.

In order to produce a movable bearing, the inner bearing can be a cylindrical roller bearing, with one of the respective bearing rings having guide edges, and the other being edgeless. Such a bearing permits axial displacement of the shaft with respect to the housing.

Finally, if sufficient axial building space is available, a fixed bearing can be made from this bearing by providing a separate axial bearing next to the cylindrical roller bearing. This arrangement can employ a cross roller bearing for guiding the bearing in both axial directions.

Further arrangements of different construction are of course possible within the scope of the invention.

While the invention to be described in the following disclosure is a so called three row bearing, i.e. a construction with two radially superimposed bearings, wherein one of the rings, the so called intermediate ring, carries both the inner race of the outer bearing as well as the outer race of the inner bearing, it is of course apparent that the invention is applicable to bearings having three or more radially superimposed bearings.

In order that the invention may be more clearly understood, it will now be disclosed in greater detail with reference to the accompanying drawings, wherein.

Figure 1:
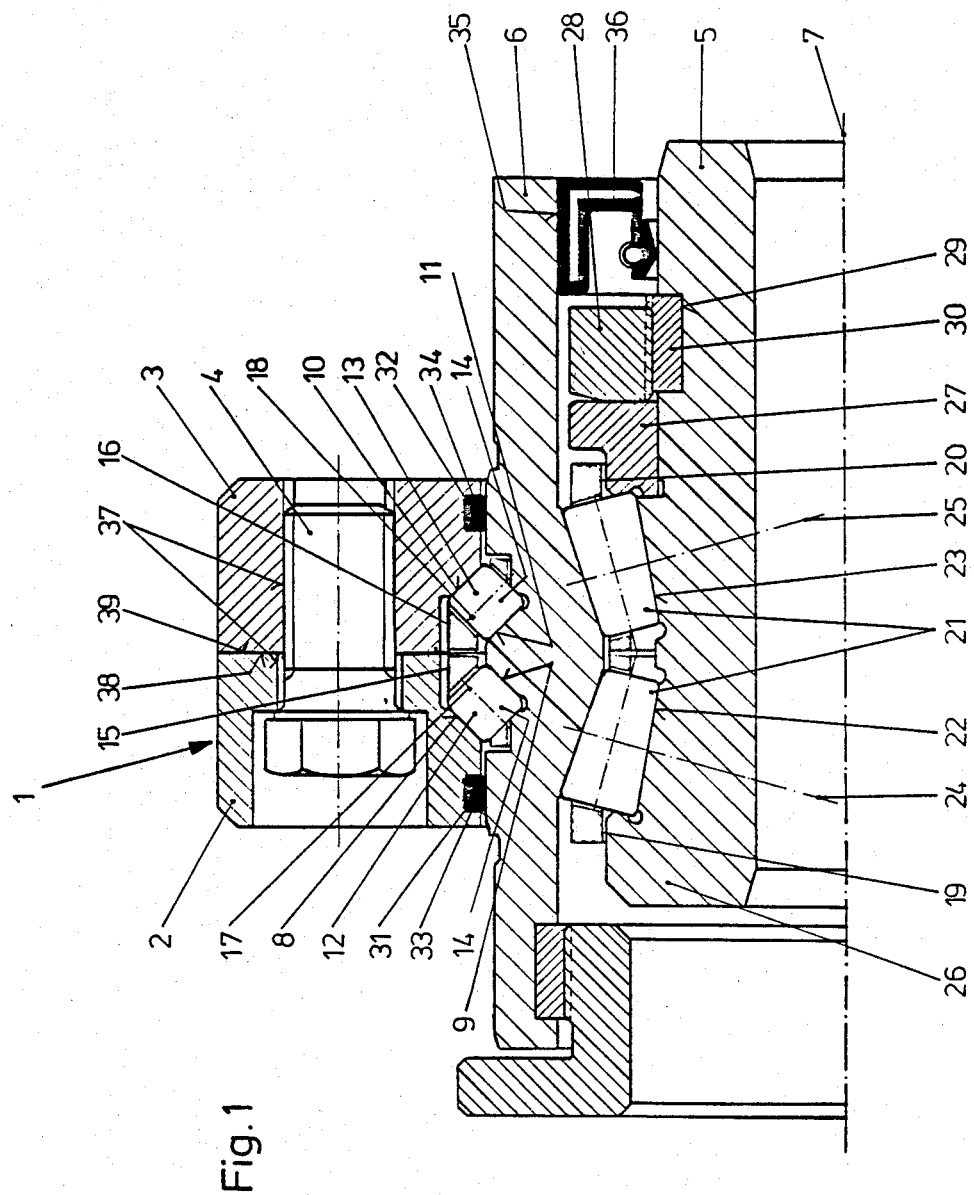
FIG. 1 is a longitudinal cross sectional view of a portion of a three ring bearing formed as a fixed bearing, in accordance with the invention.

The bearing illustrated in FIG. 1 is comprised of an outer ring 1 formed of two rings 2 and 3 centered and held together by screws 4 (only one of which is illustrated), an inner ring 5 and an intermediate ring 6 arranged between the inner and outer rings. Rolling bodies are arranged between the individual rings. One row 12 of cylindrical rollers 14 held in a cage 15 is positioned to roll between races 8 and 9 on an inner radial surface of the outer ring 3 and on an outer radial surface of the intermediate ring 6, respectively. Similarly, another row 13 of cylindrical rollers 14 held in a cage 16 is positioned to roll between races 10 and 11 on an inner radial surface of the outer ring 3 and on an outer radial surface of the intermediate ring 6. The axes of the rollers of the rows 12 and 13 are inclined to the axis of rotation 7 of the bearing. The axis of rotation 17 of the cylindrical rollers of the one row 12 is inclined to the axis of rotation 18 of the cylindrical rollers of the other row 13.

Two rows 22,23 of tapered rollers 21, held in cages 19,20, are provided as the rolling elements between the intermediate ring 6 and the inner ring 5, the two rows being arranged with the force action lines 24 and 25 of the two rows diverging toward the bearing axis 7 (i.e. an O arrangement is formed). On one axial end the inner ring 5 is provided with a fixed guide edge 26, e.g. an edge unitary with the inner ring 5 and axially abutting the end of the rollers 21 of row 22 away from row 23. A free guide edge 27 (i.e. a guide edge not unitary with the ring 5) is provided abutting the end of the rollers of the row 23 away from the row 22. The free guide edge 27 is axially positioned by a slotted nut 28 and positioned against the end surface of the tapered rollers 21 of the row 23. For this purpose the slotted nut 28 is threaded on an externally threaded ring 30 fitted in an annular groove 29 of the inner ring 5. Round cord rings 33 and 34 or the like are positioned in annular grooves 31 and 32 of the rings 2 and 3 for sealing of the outer bearing rings, while the inner bearing is outwardly sealed by a shaft seal 36 set in a shoulder in the bore of the intermediate ring 6.

The play free adjustment or prestressing of the outer bearing is produced by the screws 4, which extend through axial bores 37 of the rings 2 and 3. The two rings 2 and 3 are fit, for example, by grinding of their facing ends 38 and 39, so that the two roller rows 12 and 13 are play free or engage one another with prestress on the races 8,9 and 10,11. The free guide edge 20 is pressed against the tapered roller of the row 23 during installation of the inner bearing.

Figure 2:
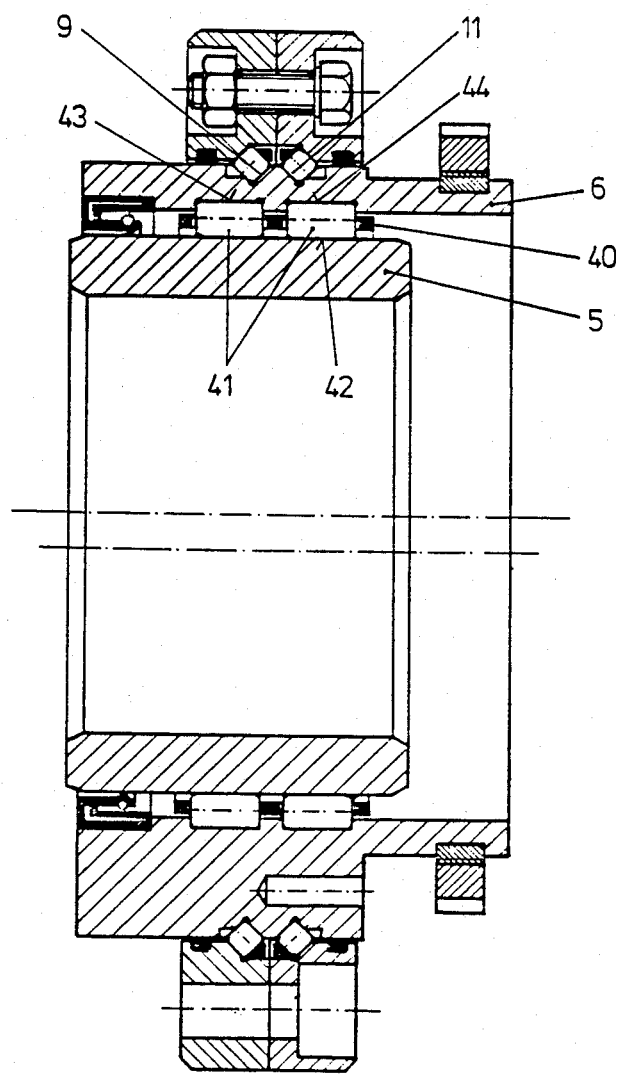
FIG. 2 is a longitudinal cross sectional view of a portion of a three ring bearing formed as a movable bearing, in accordance with a further embodiment of the invention.

In the movable bearing of FIG. 2, instead of the two row tapered roller bearing, the inner bearing is a cylindrical roller bearing. The cylindrical rollers are guided in a common cage 40 and roll on the smooth cylindrical race 42 of the inner ring 5. The outer races 43 and 44 are recessed in the intermediate ring 6, and in fact are eccentric with respect to the races 9 and 11 of the outer bearing.

Figure 3:
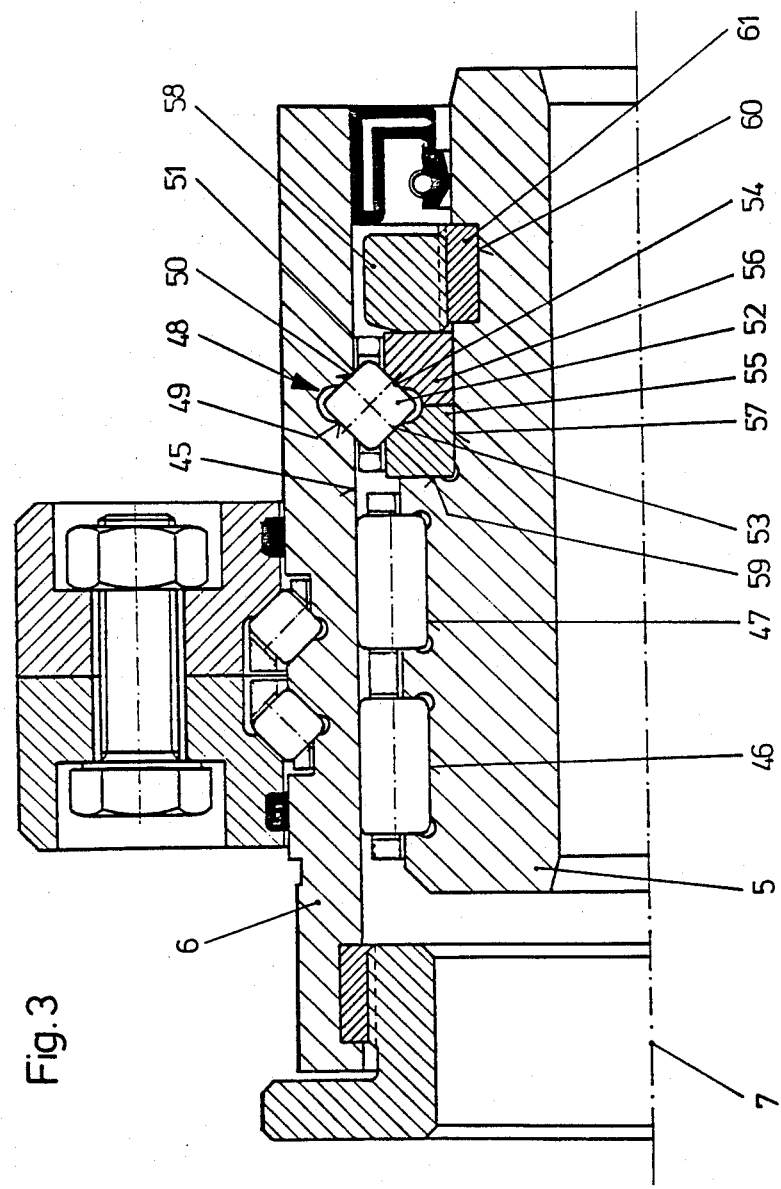
FIG. 3 is a longitudinal cross sectional view of a portion of a modification of the bearing of FIG. 2, formed as a fixed bearing.

In order to render the bearing also suitable for the axial guiding of a shaft, i.e. as a fixed bearing, in the embodiment of FIG. 3 a cross roller 48 is provided adjacent to the cylindrical roller. The outer race for the cylindrical rollers comprises the smooth cylindrical bore 45 of the intermediate ring 6, while the inner races 46 and 47 are recessed in the outer surface of the inner ring 5. The two outer races 49 and 50 of the crossed roller beariang extend crosswise and at an angle to the bearing axis 7 and are formed in the bore 45 of the inner ring 6 for outwardly guiding the cylindrical rollers 52 in a cage 51. The inner races 53 and 54 of the crossed roller bearing are formed on two rings 55 and 56 respectively set on a shoulder 57 of the inner ring 5 and pressed by means of a slotted nut 58 against the shoulder 59. The slotted nut 58 is threaded on a threaded ring 61 inserted in an annular groove 60 in the ring 5.

Figure 4:
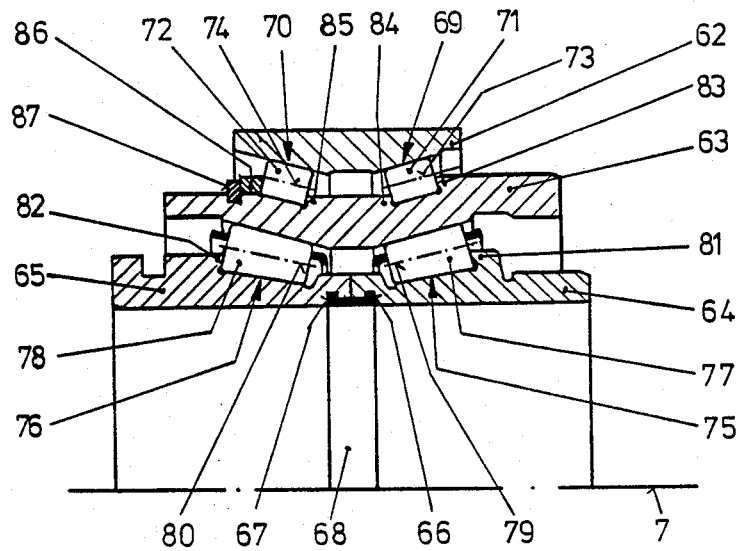
FIG. 4 is a longitudinal cross sectional view of a portion of a further embodiment of the invention.

The embodiment of the invention illustrated in FIG. 4 on the other hand is comprised of an outer ring 62, an inner ring and a centrally arranged intermediate ring 63. The outer ring 62 is here a one piece ring, while the inner ring is divided at right angles to the axis of the bearing to form the two separate rings 64 and 65 joined together by an annular clamp having a Ushaped cross section with its arms 66,67 extending into corresponding grooves of the divided rings 64,65.

Cylindrical rollers 71,72 are arranged in two rows 69,70 between the outer ring 62 and the intermediate ring 63, the axes of rotation of the rollers 71,72 converging toward the axis of rotation 7. The force action lines of the cylindrical rollers 71,72 diverge toward the axis of rotation 7, to provide an O-arrangement. Two rows 75,76 of tapered rollers 77,78 are arranged with their axes of rotation converging toward the axis 7, between the inner rings 64 and 65 and the intermediate ring 63. These rows of bearings are guided by the fixed guide edges 81,82 of the inner rings 64,65.

The cylindrical rollers 71 of the cylindrical roller row 69 of the outer bearing are guided between fixed guide edges 83,84 of the intermediate ring 63, while the cylindrical rollers the row 70 are guided on one end thereof by the fixed inner edge of the intermediate ring 63. A free guide edge 86 is provided at the other end the cylindrical rollers 72. The guide edge 86 is axially fixed by a spring washer 87 fitted in an annular groove in the intermediate ring 6. The assembly of the cylindrical rollers 71,72 of the outer bearing, as well as the tapered rollers 77,78 of the inner bearing, in a simple manner is thereby rendered possible.

Figure 5:
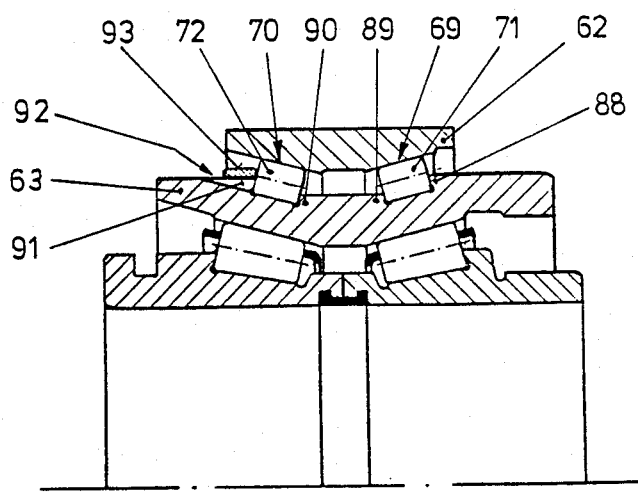
FIG. 5 is a longitudinal cross sectional view of a portion of a variation of the bearing of FIG. 4.

The bearing illustrated in FIG. 5 corresponds largely to the bearing illustrated in FIG. 4, however here the cylindrical rollers 71,72 of both of the rows 69,70 are guided by fixed guide edges, i.e. guide edges 88,89 and 90,91 respectively. In order to enable assembly of the bearing possible, a filling opening 92 is provided in the guide edge 91, through which the cylindrical rollers 72 of the roller row 70 can be inserted after the cylindrical rollers 71 have been assembled in the cylindrical roller row 69 and the outer ring 62 has been pushed over the intermediate ring 63. The filling opening 92 can then be closed by pressing a ring element 93 on the intermediate ring.

Figure 6:
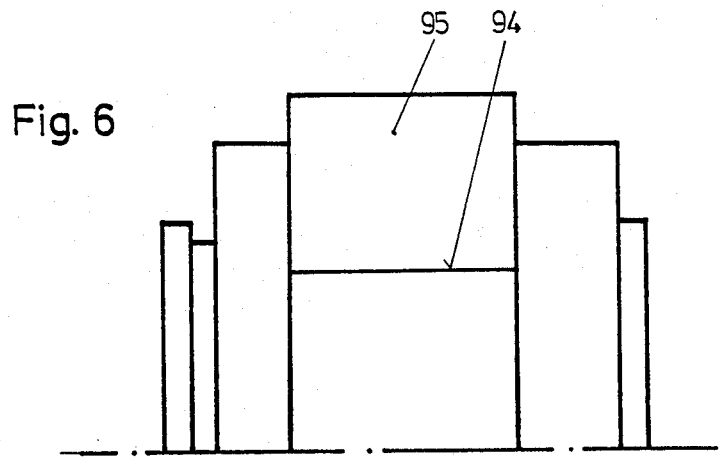
FIG. 6 is a simplified illustration of a modification of the bearing of FIG. 4.

A further possibility of assembly of the outer bearing, as illustrated in FIG. 6, is also by the use of a known split ring 95, i.e. by the use of an outer ring 95 having an axially extending joint 94. In this case the cylindrical rollers of both rows of cylindrical roller rows of the outer bearing can be arranged between fixed guide edges, and the split ring 95 brought to a central position over the cylindrical rollers after being elastically spread open.

Figure 7:
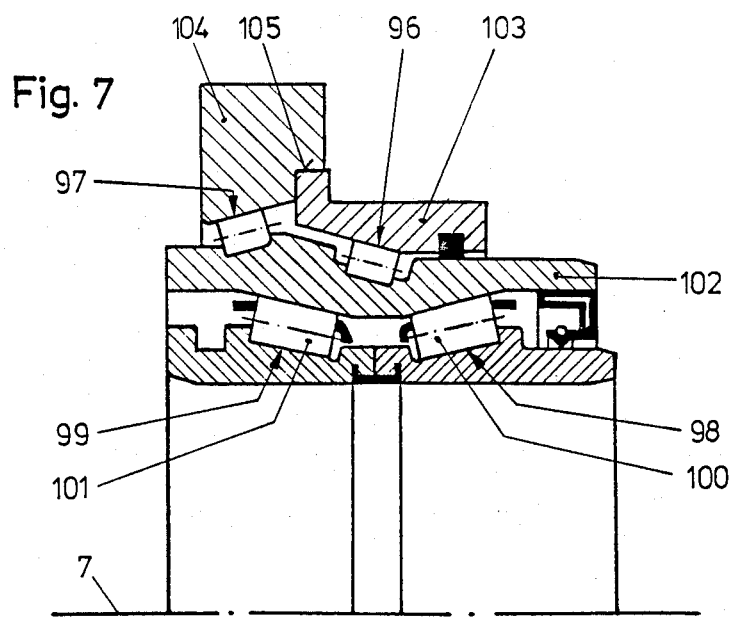
FIG. 7 is a longitudinal cross sectional view of a portion of a still further embodiment of the invention.

Finally, FIG. 7 illustrates an embodiment of a bearing in which the two cylindrical roller rows 96,97 of the two row outer inclined roller bearings are axially displaced with respect to the two tapered roller rows 98,99 of the inner tapered roller bearing. The displacement is so selected that the cylindrical roller row 96 is arranged to extend through a radial plane between the two tapered roller rows 98 and 99, in which—subject to the taper angle of the tapered rollers 100, 101 and the inclination angle of the tapered roller arrangement—the material thickness of the intermediate ring 102 is large. The rings 103,104 of the outer ring, separated transversely to the axis 7, have different diameters. The ring 103 of lesser diameter can serve for the centering of the bearing in a housing bore (not shown) and the ring 104 of greater diameter can serve as a mounting flange. The ring 103 of lesser diameter is inserted, for example with a compression fit in a recess 105 of the ring 104 of larger diameter, so that also here complete assembly of the bearing arrangement can be effected in the manufacturing plant.

Modification of the illustrated embodiments can be provided comprising axially further spaced apart tapered roller rows in the inner bearing, and narrower adjacent cylindrical roller rows in the outer bearing, both cylindrical roller rows being in the thick material region of the intermediate ring between the tapered roller rows.

While the invention has been disclosed and described with reference to a limited number of embodiments, it will be apparent that variations and modifications may be made therein, and it is therefore intended in the following claims to cover each such variation and modification that falls within the true spirit and scope of the invention.

What is claimed is:

1. In a plural ring bearing comprised of at least outer and inner radially superimposed rolling bearings and with at least one intermediate ring common to the inner and outer bearings, the improvement wherein the outer bearing comprises an inclined roller bearing with two rows of cylindrical rollers inoiined with respect to one another and to the axis of the plural ring bearing.

2. The plural ring bearing of claim 1 wherein the cylindrical rollers of the two rows are arranged with their axes of rotation diverging toward the axis of rotation of the plural ring bearing.

3. The plural ring bearing of claim 2 wherein the outer ring is separated into two rings along a dividng line extending at right angles to the axis of the plural ring bearing, and further comprising means for joining said two rings axially together.

4. The plural ring bearing of claim 1 wherein the cylindrical rollers of the two rows are arranged with their axes of rotation converging toward the axis of rotation of the plural ring bearing.

5. The plural ring bearing of claim 1 wherein the outer ring of said plural row bearing comprises a split ring.

6. The plural ring bearing of claim 1 wherein a free guide edge is arranged on one of said rings, and further comprising means for securing the free guide edge in the axial direction.

7. The plural ring bearing of claim 1 comprising fixed guide edges for guiding the rollers of both of the cylindrical roller rows, and a filling opening in one of the guide edges for insertion of said cylindrical rollers.

8. The plural ring bearing of claim 1 comprising cylindrical rollers of two rows arranged in a common axial plane between two of said rings and alternating in the circumferential direction.

9. The plural ring bearing of claim 1 wherein the inner bearing has two rows of rolling bodies, and said two outer cylindrical roller rows are axially displaced with respect to the two inner rolling body rows.

10. The plural ring bearing of claim 1 wherein the inner bearing comprises a two row tapered roller bearing with a free adjustable guide edge on the inner ring abutting the tapered rollers on one row thereof.

11. The plural ring bearing of claim 10 comprising a threaded slotted nut mounted to affix the free guide edge to the inner ring.

12. The plural ring bearing of claim 11 wherein the slotted nut is threaded on an externally threaded ring inserted in an annular groove of the inner ring.

13. The plural ring bearing of claim 1 wherein the inner bearing is a two row tapered roller bearing and the inner ring is divided in a direction at right angles to the plural ring bearing axis into first and second rings, and further comprising clamping means for clamping said first and second rings together.

14. The plural ring bearing of claim 1 wherein the inner bearing is comprised of a cylindrical roller bearing, in which one bearing ring is provided with a rim and the other bearing ring is rimless.

15. The plural ring bearing of claim 14 wherein the inner bearing further comprises an axial force receiving bearing in addition to said cylindrical roller bearing.

16. The plural ring bearing of claim 15 wherein the axial force receiving bearing comprises crossed roller bearing.

* * * * *

UNITED STATES PATENT AND TRADEMARK OFFICE
CERTIFICATE OF CORRECTION

PATENT NO. : 4,834,560

DATED : May 30, 1989

INVENTOR(S) : Jacob et al.

It is certified that error appears in the above-identified patent and that said Letters Patent is hereby corrected as shown below:

Column 4, line 35, change "Ushaped" to --U-shaped--.

Column 5, line 58, change "inoiined" to --inclined--.

Signed and Sealed this

Fifteenth Day of December, 1992

*Attest:*

DOUGLAS B. COMER

*Attesting Officer*      *Acting Commissioner of Patents and Trademarks*